US009380506B2

(12) United States Patent
Silver et al.

(10) Patent No.: US 9,380,506 B2
(45) Date of Patent: *Jun. 28, 2016

(54) SYSTEM, METHOD, AND COMPUTER-READABLE MEDIUM FOR PROVISIONING DUAL-HOMED VOICE CALL CONTINUITY

(71) Applicant: Tango Networks, Inc., Richardson, TX (US)

(72) Inventors: Andrew Silver, Frisco, TX (US); Steven E. Tryon, Plano, TX (US); Patricia A. Landgren, Plano, TX (US); Lathan W. Lewis, Dallas, TX (US)

(73) Assignee: Tango Networks, Inc., Richardson, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/243,125

(22) Filed: Apr. 2, 2014

(65) Prior Publication Data

US 2014/0211761 A1 Jul. 31, 2014

Related U.S. Application Data

(63) Continuation of application No. 12/196,097, filed on Aug. 21, 2008, now Pat. No. 8,705,487.

(60) Provisional application No. 60/957,121, filed on Aug. 21, 2007.

(51) Int. Cl.
*H04W 36/14* (2009.01)
*H04W 36/00* (2009.01)
*H04W 76/04* (2009.01)

(52) U.S. Cl.
CPC .......... *H04W 36/14* (2013.01); *H04W 36/0022* (2013.01); *H04W 76/04* (2013.01)

(58) Field of Classification Search
CPC . H04W 36/0022; H04W 36/14; H04W 88/06; H04W 80/10; H04L 65/1016; H04L 65/1083
See application file for complete search history.

(56) References Cited

U.S. PATENT DOCUMENTS

| 7,522,585 | B2 * | 4/2009 | Liu | H04W 36/0022 370/353 |
| 2008/0273524 | A1 * | 11/2008 | Tenny | H04W 68/12 370/352 |
| 2009/0034472 | A1 * | 2/2009 | Purnadi | H04W 36/0027 370/331 |

* cited by examiner

*Primary Examiner* — Jung Park

(57) ABSTRACT

A system, method and computer-readable medium for concurrent support of Voice Call Continuity (VCC) capabilities in both the enterprise space and the carrier space are provided. The enterprise VCC functionality is used when the user is located in the enterprise domain which does not impact the carrier's network while the carrier VCC capability is used when the user is located in the carrier domain to support seamless handover between the wireless networks that the carrier may offer. The carrier VCC anchoring point and the enterprise VCC anchoring point may communicate with each other to confirm and inform the other anchoring point that a call handover is occurring or will occur.

22 Claims, 16 Drawing Sheets

SYSTEM, METHOD, AND COMPUTER-READABLE MEDIUM FOR PROVISIONING DUAL-HOMED VOICE CALL CONTINUITY

RELATED APPLICATION DATA

This patent application is a continuation of U.S. patent application Ser. No. 12/196,097, entitled "SYSTEM, METHOD AND COMPUTER-READABLE MEDIUM FOR PROVISIONING DUAL-HOMED VOICE CALL CONTINUITY" filed Aug. 21, 2008, issued U.S. Pat. No. 8,705,487, issued Apr. 22, 2014, which claims the benefit of provisional U.S. Patent Application Ser. No. 60/957,121, entitled "Dual-Homed Voice Call Continuity", filed Aug. 21, 2007, each of which is hereby incorporated by reference.

CROSS-REFERENCE TO RELATED APPLICATIONS

This application is related to commonly assigned U.S. Provisional Application No. 60/957,121, entitled "Dual-Homed Voice Call Continuity," filed on Aug. 21, 2007, the entirety of which is hereby incorporated by reference herein.

FIELD OF THE INVENTION

The present disclosure relates to telecommunications and, more particularly, to provisioning voice call continuity in a telecommunications network.

BACKGROUND

Corporations are increasingly relying on the use of cellular technology by their employees, yet enterprises have traditionally lacked adequate means to control cellular service in terms of costs, Quality of Service, and corporate monitoring. This is because cellular service has conventionally been controlled by wireless carrier networks and managed independently of, and with no connectivity to, the enterprise voice and data networks.

Many contemporary mobile phones are available that support both cellular and other broadband radio technologies. For example, numerous mobile phones, or user equipments, are currently or will be commercially available that support a combination of the Global System for Mobile communications (GSM) and/or CDMA IS-95, as well as 3G technologies such as UMTS, HSPA or CDMA 1×RTT, 4G technologies such as LTE or WiMAX, and unlicensed technologies such as Wi-Fi. A wide range of Internet applications may then be accessed from user equipments featuring dual-mode, tri-mode or multi-mode technologies using wireless broadband, such as 3G UMTS, 4G WiMAX and unlicensed WiFi. For example, voice over IP (VoIP) traffic may be carried over alternative radio interfaces, such as 3G UMTS, 4G WiMAX and unlicensed WiFi.

The 3GPP has defined the Voice Call Continuity (VCC) specifications in order to describe how a voice call may be maintained as a mobile phone moves between circuit switched and packet switched radio domains. As referred to herein, a 2G service comprise a circuit switched service, and a 3G, 4G or unlicensed service comprises a packet switched service.

When a user equipment (UE) becomes attached and detached from wireless access points, such as WiFi hotspots, a client application in a contemporary UE communicates the radio conditions to a VCC platform in the network. This allows circuit switched and IP call legs to be originated and terminated such that the speech path is transferred between domains transparently to the end user.

Because most packet-switched access points utilize fixed backhaul technologies, seamlessly moving between packet and circuit domains allows the best quality and most cost efficient radio to be used at any given point in time, regardless of the transport technology used for the media. Service providers are interested in VCC in order to offer products directed to particular market segments, e.g., enterprise users. Enterprises are also interested in VCC typically for enabling dual-mode devices, e.g. GSM and WiFi, to be able to circumvent the service providers network.

SUMMARY OF THE INVENTION

Embodiments disclosed herein provide mechanisms for supporting Voice Call Continuity (VCC) capabilities in both the enterprise space and the carrier space simultaneously. The enterprise VCC functionality is used when the user is located in the enterprise domain which does not impact the carrier's network while the carrier VCC capability is used when the user is located in the carrier domain to support seamless handover between the wireless networks that the carrier may offer. The carrier VCC anchoring point and the enterprise VCC anchoring point may communicate with each other to confirm and inform the other anchoring point that a call handover is occurring or will occur.

BRIEF DESCRIPTION OF THE DRAWINGS

Aspects of the present disclosure are best understood from the following detailed description when read with the accompanying figures, in which.

DETAILED DESCRIPTION

Figure 1:
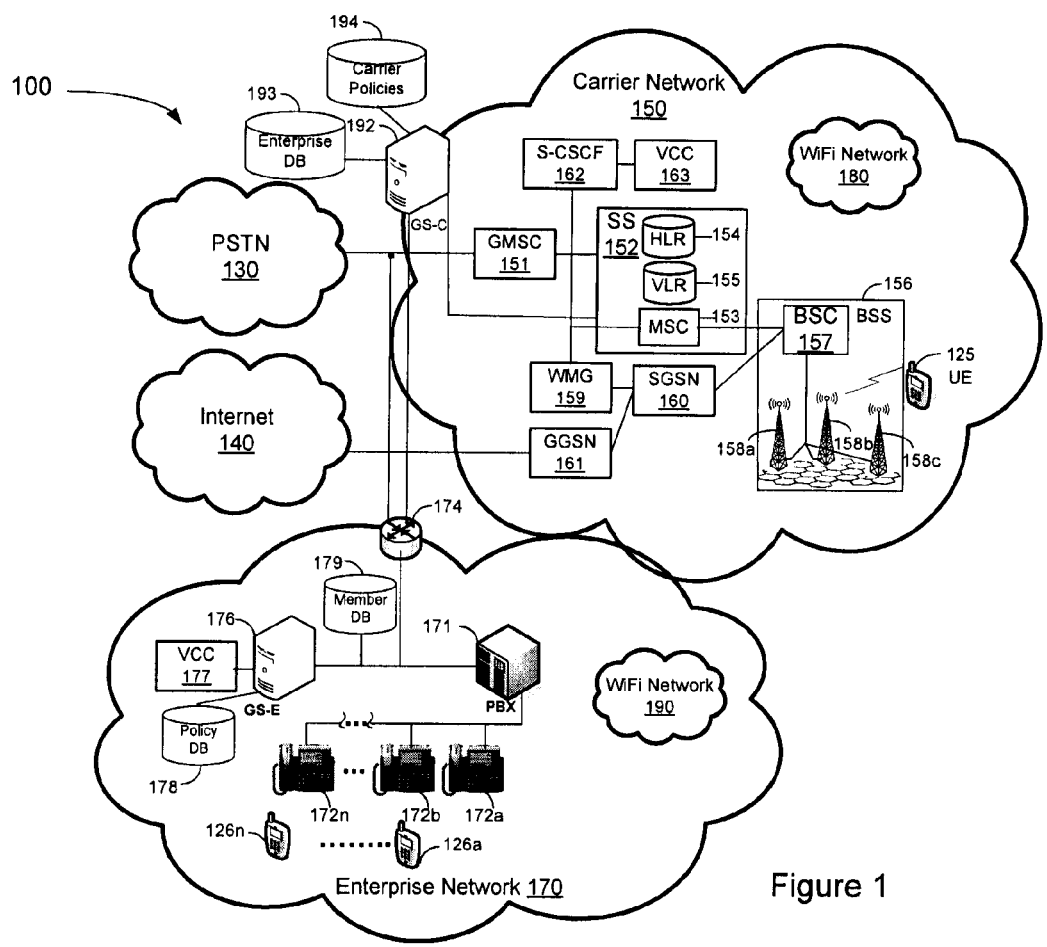
FIG. 1 is a diagrammatic representation of a network architecture in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Heretofore, no mechanisms have been provided for enabling support for VCC capabilities in both the enterprise space and the carrier (service provider) space simultaneously and advantageously for both the enterprise and the carrier.

FIG. 1 is a diagrammatic representation of an exemplary network system 100 in which embodiments disclosed herein may be implemented. A carrier network 150 includes a gateway Mobile Switching Center (GMSC) 151 that provides an interface between the public switched telephone network (PSTN) 130 and carrier network 150. GMSC 151 determines which MSC currently services a called mobile terminal. Carrier network 150 includes a switching sub-system (SS) 152 and a base station sub-system (BSS) 156. Each of SS 152 and BSS 156 contain a number of functional units well understood by those skilled in the art, and a detailed explanation of the various components is unnecessary. Nevertheless, a cursory review of various components is provided. SS 152 may contain a MSC 153, a Home Location Register (HLR) 154, and a Visitor Location Register (VLR) 155. MSCs carry out switching functions and manage the communications between mobile phones and the PSTN 130. HLR 154 comprises the central database that contains details of each mobile phone subscriber that is authorized to use the cellular core network. VLR 155 comprises a database which stores information about all the mobile terminals that are currently serviced by the associated MSC. VLR 155 stores various information regarding the mobile terminals, such as the current location area identity that specifies a particular base station controller (BSC) currently servicing the mobile terminal.

Various other sub-systems or functional modules may, and typically are, included in SS 152, such as an Authentication Center, an Equipment Identity Register, or various other functions. A serving general packet radio service (GPRS) support node (SGSN) 160 may be included in the carrier network 150 to facilitate provisioning of packet services to and from mobile terminals in network 150. To this end, the SGSN may interface with a BSC 157 for providing a packet interface therewith. GPRS provides mobility management, session management and transport for Internet Protocol packet services in cellular packet networks.

BSS 156 contains a BSC 157 that may be in communication with and in control of a plurality of Base Transceiver Stations (BTSs) 158a-158c. Each individual BTS 158a-158c under the control of a given BSC 157 may define a radio cell operating on a set of radio channels thereby providing service to a UE 125.

As is understood, various GPRS infrastructure may be included in network 150 to provide packet services to mobile terminals. In general, the SGSN 160 may interface with a wireless media gateway (WMG) 159 that is communicatively coupled with the MSC 153. The WMG 159 typically includes a control function and a media function. The WMG 159 may include a signaling interface, e.g., the Session Initiation Protocol (SIP), with a serving-call session control function (S-CSCF) 162. The WMG 159 may include a circuit switched, e.g., a time division multiplexed (TDM), interface with the MSC and provides media conversion of circuit-switched data and packet-switched data. The WMG 159 may include a packet-switched interface with the SGSN 160. A gateway GPRS support node (GGSN) 161 may interface the GPRS backbone with an external packet network, such as the Internet 140. Thus, circuit-switched data, such as TDM voice calls, may be provided to a UE 125 over an air-interface via the MSC and BSC interface. Packet-switched data may be provided to a UE 125 via the WMG 159, SGSN 160, and BSC 157 interface.

SGSN 160 may interface with various subsystems of network 150. For example, SGSN 160 may have a Gs interface with MSC 153 and VLR 155 that facilitates paging and station availability notification when performing data transfers. SGSN 160 may additionally have a Gr interface with HLR 154 through which messaging may be performed, for example, over the Mobile Application Part protocol.

The S-CSCF 162 provides a central signaling plane node that may additionally provide session control. The S-CSCF 162 may be implemented as a SIP server. The S-CSCF may manage SIP registrations, select application servers for a particular session, provide routing services, enforce carrier policies, as well as provisioning of various other services. The S-CSCF 162 may host or interface with a carrier VCC service 163 that provides voice call continuity services when the VCC is anchored in the carrier network. The S-CSCF 162 may interface with the control function of the WMG 159.

Carrier network 150 may additionally include, or alternatively interface with, a WiFi network 180 that may provide packet switched services to a suitable UE. In one implementation, WiFi network 180 may include various access points, or hot spots, and a suitably adapted UE may roam or transition from the carrier network to the WiFi network. In the event the UE is attached to the carrier network in a circuit-switched mode, a handover of the UE from the circuit-switched carrier infrastructure to the packet-switched WiFi network 180 may be performed utilizing VCC services. In another event where the UE is attached to the carrier network in a packet-switched mode, a handover of the UE from the packet-switched carrier infrastructure to the packet-switched WiFi network 180 may be performed utilizing packet-to-packet handover services.

System 100 may include an enterprise network 170 that includes a PBX 171 that provides service to any number of extensions, e.g., enterprise terminal devices 172a-172n. Additionally, PSTN 130 may interface with enterprise network 170, e.g., by a tandem or other switch coupled with enterprise router 174. Enterprise network 170 may include an enterprise gateway server (GS-E) 176 that may be communicatively coupled with a carrier gateway server (GS-C) 192 deployed in, or interconnected with, carrier network 150. Enterprise network 170 may include or interface with a WiFi network 190, or other packet switched network, with which dual mode, or greater, UEs adapted for packet switched communications may access.

A single enterprise network 170 is depicted to facilitate an understanding of the disclosed embodiments, but numerous enterprise networks may interface with GS-C 192. To this end, the GS-C 192 may include, or interface with, an enterprise database 193 that facilitates routing of calls and associated signaling to an appropriate enterprise network. For example, enterprise database 193 may maintain an association of directory numbers of terminal devices 172a-172n and MSISDNs of user equipment 126a-126n with an address or other reference to the corresponding enterprise network, such as a uniform resource locator assigned to the GS-E 176.

GS-E 176 may interact with GS-C 192 deployed or interconnected with carrier network 150. The connection between GS-E 176 and GS-C 192 may be made over, for example, session initiation protocol (SIP) or other protocols. This configuration may enable carrier network 150 to have a central point of control for interacting with multiple enterprises, and may not require the use of SS7 messaging to the enterprise. Rather, it is possible to have a secure IP connection supporting SIP. This is also useful for offering a Centrex solution for interconnecting with a carrier-hosted PBX, or for interconnecting a carrier-hosted gateway server with enterprise-hosted PBX systems. GS-C 192 may support an SS7 point code multiplexer in which only one or two point codes are needed to address all enterprises since GS-C 192 can identify for which enterprise a message is intended. GS-E 176 may be adapted to provision GS-C 192 automatically over an IP interface to manage subscribers, e.g., to add new pilot directory numbers for new subscribers. Enterprise members may be allocated a respective Enterprise terminal device 172a-172n as well as a mobile terminal, or user equipment, 126a-126n.

GS-E 176 may host or interface with an enterprise VCC service 177 that provides voice call continuity service when the VCC is anchored in the enterprise network in accordance with an embodiment. A UE that features dual-mode capabilities, or greater, that is adapted to operate in both a circuit switched mode and a packet switched mode may monitor the radio environment when the UE is operating in a particular network. In the event that the UE detects another network that is desirable for handover, the UE may attempt to register with the detected network. For example, the UE may be configured for preference of a wireless network over another based on a threshold of the signal strength that it observes from the network. When a UE requests a handover from a circuit switched network to a packet switched network, or vice versa, a VCC service may determine whether to allow or disallow the handover. In accordance with disclosed embodiments, the VCC handover decision may be conjunctively determined by both carrier and enterprise entities. In one embodiment, carrier policies 194 may be evaluated by the GS-C to determine whether to allow a requested handover. For example, carrier policies may specify maximum network loads over which requested handovers are to be denied, policies that disallow enterprise member handovers based on the time of day, enterprise member handover disallowance due to non-paid enterprise tariffs, or any variety of other decision criteria. In a similar manner, GS-E 176 may include or interface with an enterprise policy database 178 that specifies enterprise criteria for allowing or disallowing enterprise member handovers. For example, policy database 178 may specify times of the day at which handovers are to be disallowed, maximum network capacities over which handovers to the network are to be disallowed, handover criteria based on member UE location, or any variety of other policy specifications. Further, the policies defined in enterprise policy database 178 may be specified on an enterprise-wide basis, an enterprise member group basis, and/or an enterprise-member basis.

In another embodiment, a UE that features dual-mode capabilities, or greater, that is adapted to operate in multiple disparate packet switched modes, for example a carrier's 3G packet-switched network and an enterprise's WiFi packet-switched network or a carrier's 3G packet-switched network and a carrier's 4G packet-switched network, may monitor the radio environment when the UE is operating in a particular network. In the event that the UE detects another network that is desirable for handover, the UE may attempt to register with the detected network. For example, the UE may be configured for preference of a wireless network over another based on a threshold of the signal strength that it observes from the network. When a UE requests a handover from one packet-switched network to another packet switched network, a packet-to-packet handover service may determine whether to allow or disallow the handover. In accordance with disclosed embodiments, the packet-to-packet handover decision may be conjunctively determined by both carrier and enterprise entities. In one embodiment, carrier policies 194 may be evaluated by the GS-C to determine whether to allow a requested handover. For example, carrier policies may specify maximum network loads over which requested handovers are to be denied, policies that disallow enterprise member handovers based on the time of day, enterprise member handover disallowance due to non-paid enterprise tariffs, or any variety of other decision criteria. In a similar manner, GS-E 176 may include or interface with an enterprise policy database 178 that specifies enterprise criteria for allowing or disallowing enterprise member handovers. For example, policy database 178 may specify times of the day at which handovers are to be disallowed, maximum network capacities over which handovers to the network are to be disallowed, handover criteria based on member UE location, or any variety of other policy specifications. Further, the policies defined in enterprise policy database 178 may be specified on an enterprise-wide basis, an enterprise member group basis, and/or an enterprise-member basis.

In one embodiment, VCC handover decisions may be conjunctively made between the carrier network and the enterprise network. For example, for a VCC handover to be allowed, both the GS-C and the GS-E may be required to approve the handover. For example, the GS-C may disallow a VCC handover request approved by the GS-E. Likewise, the GS-E may disallow a VCC handover that is approved by the GS-C.

In another embodiment, VCC handover decisions may be conjunctively made between the carrier network and the enterprise network, however one network may have authority to override the decision of the other network. For example, for a VCC handover to be allowed, it is possible that the GS-C overrides a decision to disallow the handover request by the GS-E. Likewise, it is possible that the GS-E overrides a decision to disallow the handover request that is disallowed by the GS-C.

From an IT organization perspective, GS-E 176 appears as an extension to PBX 171. To carrier network 150, GS-E 176 appears as a standard in-network endpoint for delivering calls. To PBX 171, GS-E 176 appears as a set of standard PBX endpoints (e.g., deskphones, or IP clients). GS-E 176 mediates between the two disparate sets of network protocols and state machines.

GS-C 192 may include the network functions for both voice (gateway MSC) and data (gateway GPRS Support Node or Home Agent), VoIP capability for interconnecting carrier network 150 with Enterprise network 170 thereby eliminating PSTN interconnect charges, a billing gateway, and a next-generation Network Services gateway that enables third party value added services for the enterprise, such as mobile phone activation/de-activation, corporate directory integration based on IMS (IP Multimedia Subsystem), or other services. GS-C 192 may also include the element management subsystem (EMS) and a service management subsystem for the operational support system (OSS).

PBX 171 and GS-E 176 may include or interface with an enterprise member database 179 that stores records or profiles that define services for members of enterprise network 170. GS-E 176 may interface with member database 179 via a provisioning interface specific to PBX 171. Enterprise member database 179 may include records that specify enterprise members and DID numbers of telephony devices allocated thereto. Additionally, enterprise member database 179 may specify usage policies for enterprise members that may define, for example, allowable mobile terminal usage such as roaming capabilities, various preferred call progressions to be provided to Enterprise members under various circumstances, and the like.

Figure 2:
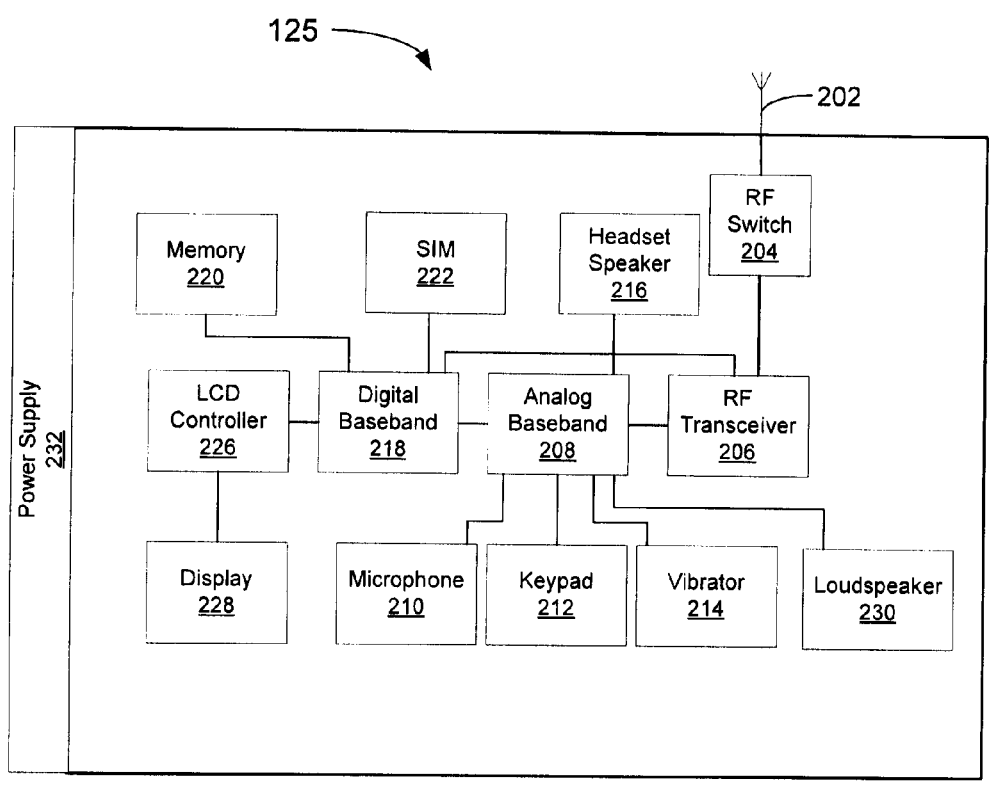
FIG. 2 is a simplified block diagram of an exemplary mobile terminal in which embodiments may be implemented.

FIG. 2 is a simplified block diagram of an exemplary UE 125 in which embodiments may be implemented. UE 125 includes an antenna 202 that may be coupled with an RF switch 204, e.g., a duplexer, coupled with an RF transceiver 206. Transceiver 206 may be coupled with an analog baseband 208 that may handle a variety of analog signal processing functions. In the present example, analog baseband 208 is interconnected with a microphone 210, a keypad 212, a vibrator 214 or other ring alert mechanism, a headset speaker 216, and a loudspeaker 230 for output of speakerphone and incoming call alert audio. Analog baseband 208 may include or interface with an analog to digital converter for converting analog input supplied to microphone 210 into a digital format that may be supplied to a digital baseband 218. Digital baseband 218 may interface with various digital components of UE 125, such as a memory 220, an optional subscriber identity module (SIM) card 222, and a liquid crystal display controller 226 that drives a display 228. Memory 220 may be implemented as a flash memory, a random access memory, an electronically erasable programmable read-only memory, another solid state device, or a combination thereof. Digital baseband 218 may additionally include or interface with one or more encoders, digital to analog converters, or other modules. A power supply 232 may be coupled with various system modules as is understood. The implementation of UE 125 depicted in FIG. 2 is exemplary only, and UE 125 may be implemented as any suitable device adapted to interface with a carrier network. UE 125, also referred to as a mobile terminal, may be implemented as a personal digital assistant (PDA), a mobile phone, a computer, or another device adapted to interface with a carrier network.

Figure 3:
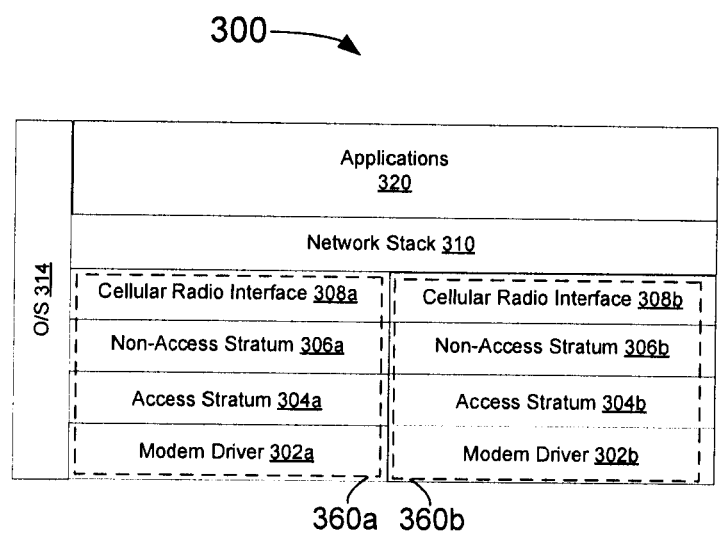
FIG. 3 is a diagrammatic representation of an exemplary software configuration of a mobile terminal implemented in accordance with an embodiment.

FIG. 3 is a diagrammatic representation of an exemplary software configuration 300 of a UE implemented in accordance with an embodiment. In the exemplary configuration of FIG. 3, the UE is configured with access network-specific software entities 360a-360b, e.g., protocol and driver software associated with a particular access network technology, such as GSM, UMTS, CDMA or another suitable radio access network, and is dependent on the particular network in which the UE is to be deployed. While configuration 300 depicts a UE adapted for deployment in two access network technology types, the UE may be implemented as a multi-mode device adapted for deployment in two or more access technology networks. Particularly, software configuration 300 includes at least one software entity, such as entity 360a, that facilitates access to a circuit switched network, and another software entity, such as entity 360b, that facilitates access to a packet switched network. The particular configuration 300 is illustrative only and is provided only to facilitate an understanding of embodiments disclosed herein.

In the illustrative example, configuration 300 includes a modem driver 302a-302b for providing a respective physical interface with an access network in which the UE may be deployed. Access-stratum 304a-304b and non-access stratum 306a-306b may be included in configuration 300. Radio interface 308a-308b may be communicatively coupled with lower layers of configuration 300 and may additionally interface with network and session management layers, e.g., a network stack 310 such as a TCP/IP layer.

In accordance with disclosed embodiment, the ability to support VCC capabilities in both the enterprise space and the carrier space simultaneously is provided.

Both the enterprise VCC and the carrier VCC functionality are invoked when the user of a multi-mode device requires support for a seamless handover between the wireless networks that the carrier may offer, such as 2G GSM and CDMA circuit voice and packet networks including 3G UMTS, HSPA, 1xRTT voice over packet, 4G LTE, WiMAX voice over packet, or unlicensed WiFi voice over packet. Similarly, the seamless handover whereby both the enterprise and carrier VCC functionality are invoked can also be supported between the carrier's 2G circuit voice and an enterprise's unlicensed WiFi voice over packet network, and between the carrier's 3G or 4G packet networks and an enterprise's unlicensed WiFi voice over packet network.

FIGS. 4A-4D depict exemplary signaling flows for a multi-mode mobile handover featuring voice call continuity from a circuit to a packet network implemented in accordance with an embodiment whereby seamless handover mechanisms are provided for calls established on the cellular side of the network by carrier VCC capabilities.

In this implementation, the carrier GS-C acts as the primary contact point by the multi-mode device when a handover is to occur, and as such the GS-C performs the VCC handover with permission obtained from the GS-E. In the particular example, a call is handed off between 2G circuit voice and either 3G, 4G or WiFi packetized voice networks while remaining anchored in the enterprise such that enterprise services, e.g., PBX features, call monitoring, and the like, may be provided to the call and maintained over the seamless handover.

Figure 4A:
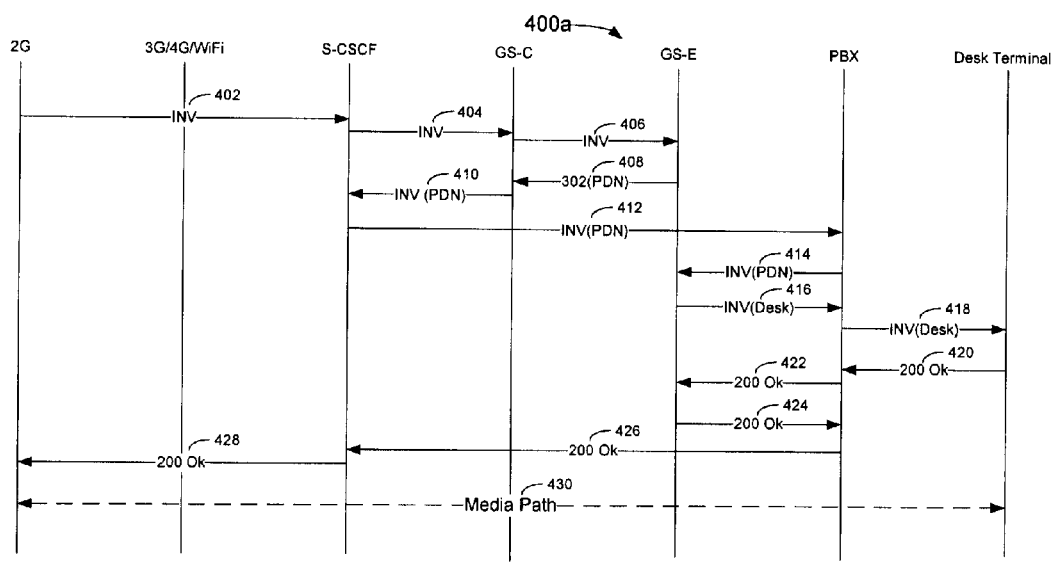
FIGS. 4A-4D depict exemplary signaling flows for a multi-mode mobile handover featuring voice call continuity from a circuit to a packet network whereby seamless handover mechanisms are provided for calls established on the cellular side of the network by carrier VCC capabilities in accordance with an embodiment.

In the signaling flow 400a of FIG. 4A, the user of a multi-mode device originates a call over the 2G network to a desk phone in the enterprise. From the 2G MSC after conversion of the call into an IMS call via triggering or another suitable method, a call invite is issued to the S-CSCF (step 402). The S-CSCF, based on initial filter criteria, sends the invite to the GS-C that features the carrier based VCC functions (step 404). The GS-C recognizes the appropriate enterprise based on the user profile and number, and then requests the GS-E for the policy to be applied to the call (step 406). The GS-E returns a redirection response, e.g., a SIP 302 response, with a pilot number to which the call is to be routed (step 408). The GS-C returns the invite with the pilot number to the S-CSCF (step 410), and the S-CSCF routes the call to the pilot number which is supported by the enterprise PBX (step 412). The PBX, on receipt of the inbound call, sends the invite to the GS-E (step 414) which replaces the pilot number with the original dialed digits using the number that it has previously stored in association with the pilot number. The GS-E then routes the call to the PBX for delivery to the desk terminal (step 416). The desk terminal may comprise, for example, a fixed landline telephone device, a software client operating on a computing platform, or a mobile terminal communicatively interfaced with the PBX. The PBX then routes the call to the desk terminal (step 418). The desk terminal then returns an invite acknowledgement (step 420), e.g., a SIP 200 response.

The PBX forwards the acknowledgment to the GS-E (step 422), which replies with an acknowledgment (step 424). The PBX then forwards the acknowledgment to the S-CSCF (step 426) which forwards the acknowledgment to the UE via the 2G MSC (step 428), and the media path is set up (step 430). In this instance, the call comprises a 2G, or circuit switched call leg, between the 2G MSC and a carrier WMG interconnected with the 2G MSC, and packet switched call legs between the WMG and the PBX, the PBX and the enterprise gateway server, and the enterprise gateway server and the desk terminal.

Figure 4B:
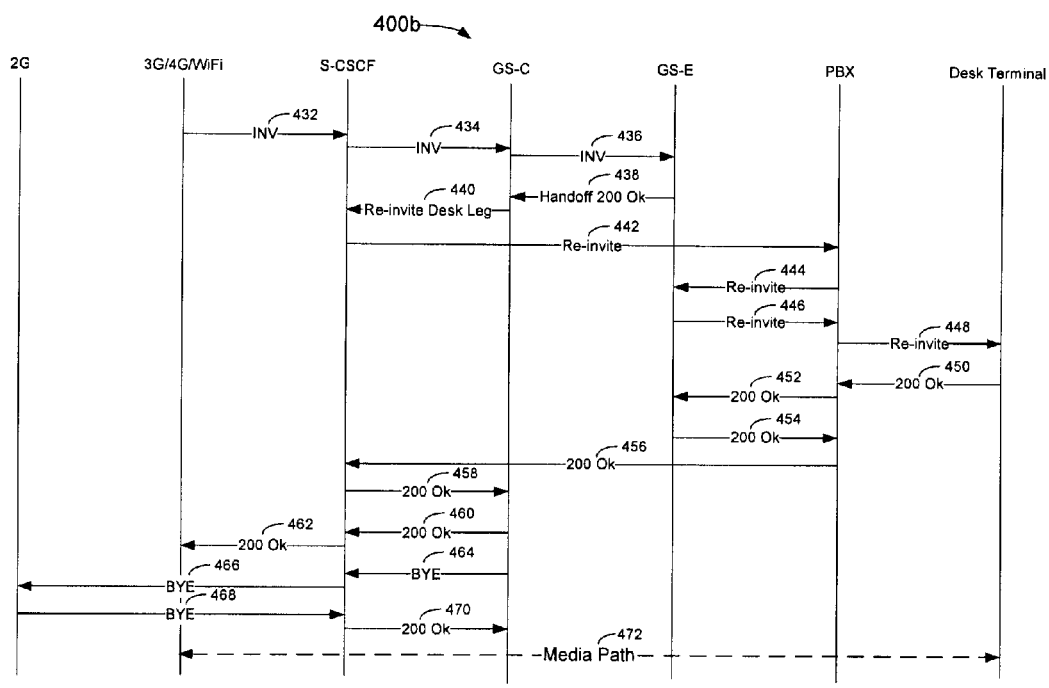

In the signaling flow 400b depicted in FIG. 4B, assume the UE now moves into a coverage area which includes 3G, 4G or unlicensed WiFi packetized service. In the present example, assume the UE identifies 3G services are provided by the carrier's UMTS or CDMA 1xEV-DO Rev. A packet network. Accordingly, the UE now attempts to initiate a handover request to the carrier's VCC service by sending an invite to the CSCF (step 432) over the carrier's 3G network. The request by the UE may be sent to an IP address or to a domain name that is resolved to the carrier's VCC service via the carrier's S-CSCF. The S-CSCF, based on initial filter criteria, sends the invite to the GS-C for handling (step 434). The GS-C may then evaluate various carrier policies specified in carrier policy database 194 for determining whether to allow or disallow the handover. If the GS-C allows the handover to occur based on criteria analyzed in the GS-C (for example, the carrier determines there is sufficient capacity on the 3G packetized network to handle this call), then the GS-C forwards the request to the GS-E (step 436) hosting the enterprise VCC function. If the GS-E allows the handover to occur based on criteria analyzed in the GS-E (for example, the enterprise elects to allow for reduced tariffs or other enterprise policy criteria evaluated in enterprise policy database 178) then the GS-E informs the GS-C to proceed (step 438). The GS-C then sends a re-invite for the leg of the call to the desk phone to the S-CSCF (step 440). The S-CSCF then forwards the re-invite to the enterprise PBX (step 442), which forwards the re-invite to the GS-E (step 444) which responds to the PBX (Step 446). The PBX forwards the re-invite to the desk terminal (step 448), and the desk terminal acknowledges the invite (step 450). The PBX then forwards the acknowledgment to the GS-E (step 452) and the GS-E provides an acknowledgment thereto (step 454). The PBX forwards the acknowledgment to the S-CSCF (step 456) which provides the acknowledgment to the GS-C (step 458) that, in turn, replies with an acknowledgment (step 460). The S-CSCF then provides an acknowledgement to the 3G MSC (step 462). The GS-C provides a BYE message to the S-CSCF for terminating the circuit switched call leg (step 464). The S-CSCF then forwards the BYE message to the 2G MSC (step 466) which may provide an acknowledgment thereto (step 468). The S-CSCF then forwards an acknowledgment to the GS-C (step 470) and the media path is set up thereby completing the call handover (step 472). The call then comprises packet-switched call legs between the 3G MSC and the PBX, the PBX and the enterprise gateway server, and the enterprise gateway server and the desk terminal.

Figure 4C:
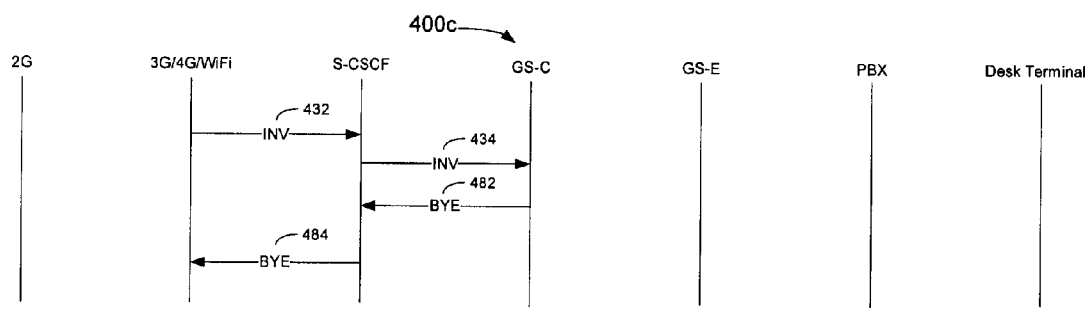

Returning to the case where the UE attempts to initiate a handover request to the carrier's VCC service by sending an invite to the S-CSCF (step 432), and the S-CSCF sends the invite to the GS-C for handling (step 434) as depicted by the signaling flow 400c of FIG. 4C. If the GS-C instead disallows the handover to occur based on criteria analyzed in the GS-C (for example, the carrier determines there is insufficient capacity on the 3G packetized network to handle this call or other criteria specified in the carrier policy database 194), then the GS-C responds with a Bye message to the S-CSCF (step 482) indicating the handover request has been denied, which is then sent via the 3G MSC (step 484) to the UE. The handover request is terminated and the UE remains connected to the 2G MSC.

Figure 4D:
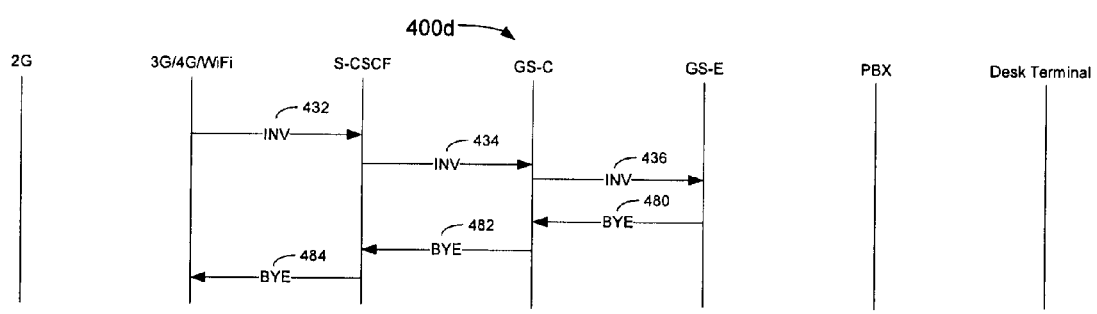

If the GS-C allows the handover to occur upon receipt of the invite based on evaluated carrier policies, the GS-C then sends the request to the GS-E for handling (step 436) as depicted by the signaling flow 400d of FIG. 4D. If instead the GS-E disallows the handover to occur based on criteria analyzed in the GS-E (for example, the enterprise elects to maintain the call on the 2G network to avoid potential high cost data tariffs, to maintain voice quality or for other enterprise policy criteria specified in enterprise policy database 178), then the GS-E responds with a Bye message to the GS-C indicating the handover request has been denied (step 480), which is sent to the S-CSCF (step 482) indicating the handover request has been denied. The Bye message is then sent to the UE via the 3G MSC (step 484). The handover request is terminated and the UE remains connected to the 2G MSC.

Figure 5A:
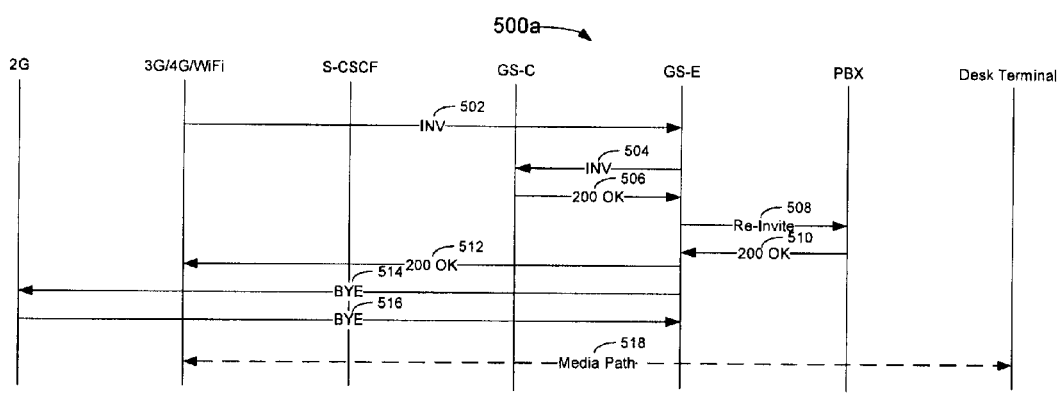
FIGS. 5A-5C depict exemplary signaling flows for a multi-mode mobile handover featuring voice call continuity from a circuit network to a packet network whereby seamless handover mechanisms are provided for calls established on the cellular side of the network by enterprise VCC capabilities implemented in accordance with another embodiment.
Figure 5B:
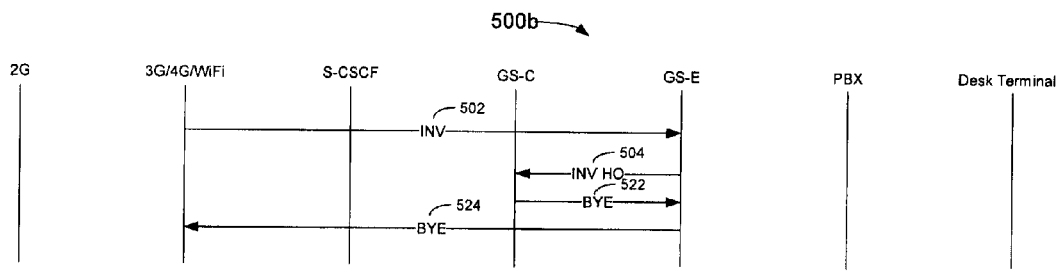
Figure 5C:
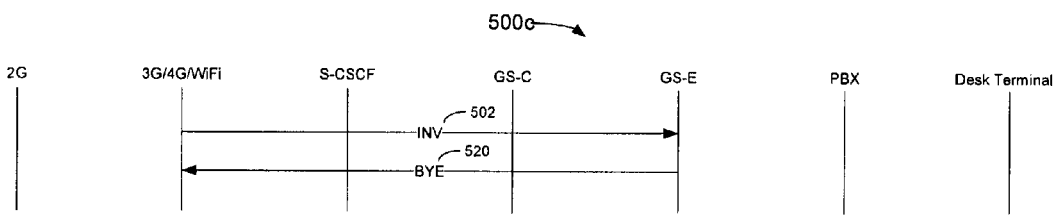

FIGS. 5A-5C depict exemplary signaling flows for a multi-mode mobile handover featuring voice call continuity from a circuit network to a packet network implemented in accordance with another embodiment whereby seamless handover mechanisms are provided for calls established on the cellular side of the network by enterprise VCC capabilities. In this implementation, the enterprise GS-E acts as the primary contact point by the multi-mode device when a handover is to occur, and as such the GS-E performs the VCC handover with permission obtained from the GS-C. In the particular example, a call is handed off between 2G voice network and a 3G/4G/WiFi packet network while remaining anchored in the enterprise such that enterprise services, e.g., PBX features, call monitoring, and the like, may be provided to the call and maintained over the seamless handover.

In the signaling flow 500a depicted in FIG. 5A, assume the user of a multi-mode device is already in a 2G circuit call as previously described in FIG. 4A. Following therefrom in FIG. 5A, assume the UE now moves into a coverage area which includes 3G, 4G or unlicensed WiFi packetized service. In the present example, assume the UE identifies 3G services are provided by the carrier's UMTS or CDMA 1xEV-DO Rev. A packet network. Accordingly, the UE now attempts to initiate a handover request to the enterprise's VCC service by sending an invite to the GS-E hosting the enterprise VCC function (step 502). The request by the UE over the carrier's 3G network may be sent to an IP address or to a domain name that is resolved to the enterprise's VCC service. If the GS-E allows the handover to occur based on criteria analyzed in the GS-E (for example, the enterprise elects to allow for reduced tariffs), then the GS-E forwards the request to the GS-C (step 504) hosting the carrier VCC function. If the GS-C allows the handover to occur based on criteria analyzed in the GS-C (for example, the carrier identifies that the enterprise has subscribed to this service, the carrier identifies there is insufficient packet coverage to maintain the packetized voice call on 3G, or for other carrier policy criteria) then the GS-C informs the GS-E to proceed (Step 506). The GS-E then sends a re-invite for the leg of the call to the desk phone to the PBX (step 508) which responds to the GS-E (Step 510). The GS-E then provides an acknowledgement to the UE via the 3G MSC (step 512). The GS-E informs the 2G MSC via a carrier WMG interconnected with the 2G MSC to terminate the circuit switched call leg (step 514) to which the 2G MSC responds (step 516), and the media path is set up thereby completing the call handover (step 518). The call then comprises packet-switched call legs between the 3G MSC and the PBX, the PBX and the enterprise gateway server, and the enterprise gateway server and the desk terminal.

Returning to the case where the UE attempts to initiate a handover request to the enterprise's VCC service by sending an invite to the GS-E (step 502), and the S-CSCF sends the invite to the GS-C for handling (step 504), if the GS-C instead disallows the handover to occur based on criteria analyzed in the GS-C (for example, the carrier determines there is insufficient capacity on the 3G network to maintain this call, the enterprise has not subscribed to this service or for other carrier policy criteria), then the GS-C responds with a Bye message to the GS-E (step 522) indicating the handover request has been denied as depicted by the signaling flow 500b of FIG. 5B. The Bye message is then sent to the UE via the 3G MSC (step 524). The handover request is terminated and the UE remains connected to the 2G MSC.

If instead the GS-E disallows the handover to occur based on criteria analyzed in the GS-E (for example, the enterprise elects to maintain the call on the 2G network to avoid potential high cost data tariffs, to maintain voice quality or for other enterprise policy criteria), then the GS-E responds with a Bye message transmitted to the UE via the 3G MSC (step 520) as depicted by the signaling flow 500c of FIG. 5C. The handover request is terminated and the UE remains connected to the 2G MSC.

FIGS. 6A-6D depict exemplary signaling flows for a multi-mode mobile handover featuring voice call continuity from a packet network to a circuit network implemented in accordance with an embodiment whereby seamless handover mechanisms are provided for calls established on the cellular side of the network by carrier VCC capabilities.

In this implementation, the carrier GS-C acts as the primary contact point by the multi-mode device when a handover is to occur, and as such the GS-C performs the VCC handover with permission obtained from the GS-E. In the particular example, a packetized voice call over a 3G packet network is handed off to a 2G voice network while remaining anchored in the enterprise such that enterprise services, e.g., PBX features, call monitoring, and the like, may be provided to the call and maintained over the seamless handover.

Figure 6A:
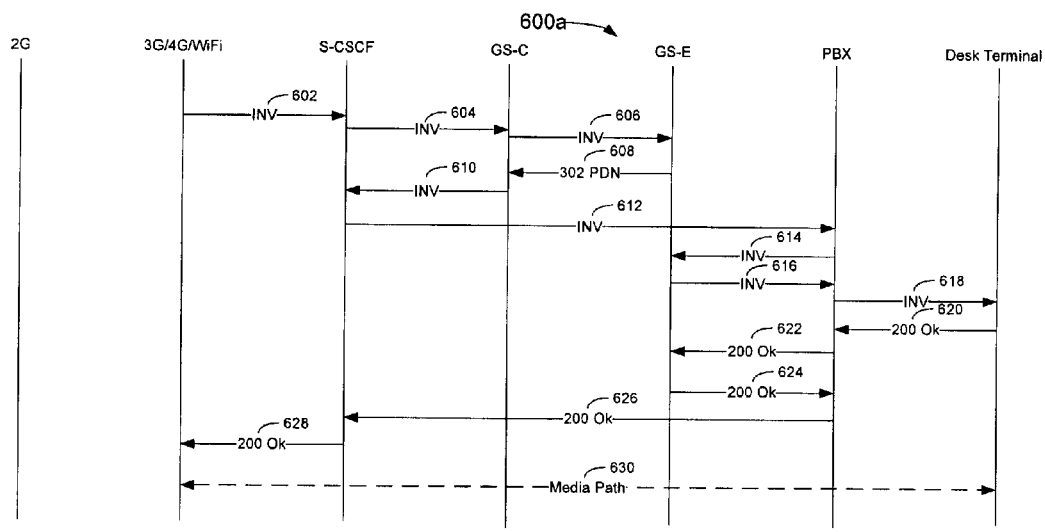
FIGS. 6A-6D depict exemplary signaling flows for a multi-mode mobile handover featuring voice call continuity from a packet network to a circuit network whereby seamless handover mechanisms are provided for calls established on the cellular side of the network by carrier VCC capabilities in accordance with an embodiment.

In the signaling flow 600a depicted in FIG. 6A, the user of a multi-mode device originates a packetized voice call over the 3G network to a desk phone in the enterprise. A call invite is issued by the UE over the 3G packet network to the S-CSCF (step 602). The S-CSCF, based on initial filter criteria, sends the invite to the GS-C that features the carrier based VCC functions (step 604). The GS-C recognizes the appropriate enterprise based on the user profile and number, and then requests the GS-E for the policy to be applied to the call (step 606). The GS-E returns a redirection response, e.g., a SIP 302 response, with a pilot number to which the call is to be routed (step 608). The GS-C returns the invite with the pilot number to the S-CSCF (step 610), and the S-CSCF routes the call to the pilot number which is supported by the enterprise PBX (step 612). The PBX, on receipt of the inbound call, sends the invite to the GS-E (step 614) which replaces the pilot number with the original dialed digits using the number that it has previously stored in association with the pilot number. The GS-E then routes the call to the PBX for delivery to the desk terminal (step 616). The desk terminal may comprise, for example, a fixed landline telephone device, a software client operating on a computing platform, or a mobile terminal communicatively interfaced with the PBX. The PBX then routes the call to the desk terminal (step 618). The desk terminal then returns an invite acknowledgement (step 620), e.g., a SIP 200 response.

The PBX forwards the acknowledgment to the GS-E (step 622), which replies with an acknowledgment (step 624). The PBX then forwards the acknowledgment to the S-CSCF (step 626) which forwards the acknowledgment to the UE over the 3G packet network (step 628), and the media path is set up (step 630). In this instance, the call comprises a packet switched call leg between the UE and the PBX, the PBX and the enterprise gateway server, and the enterprise gateway server and the desk terminal.

Figure 6B:
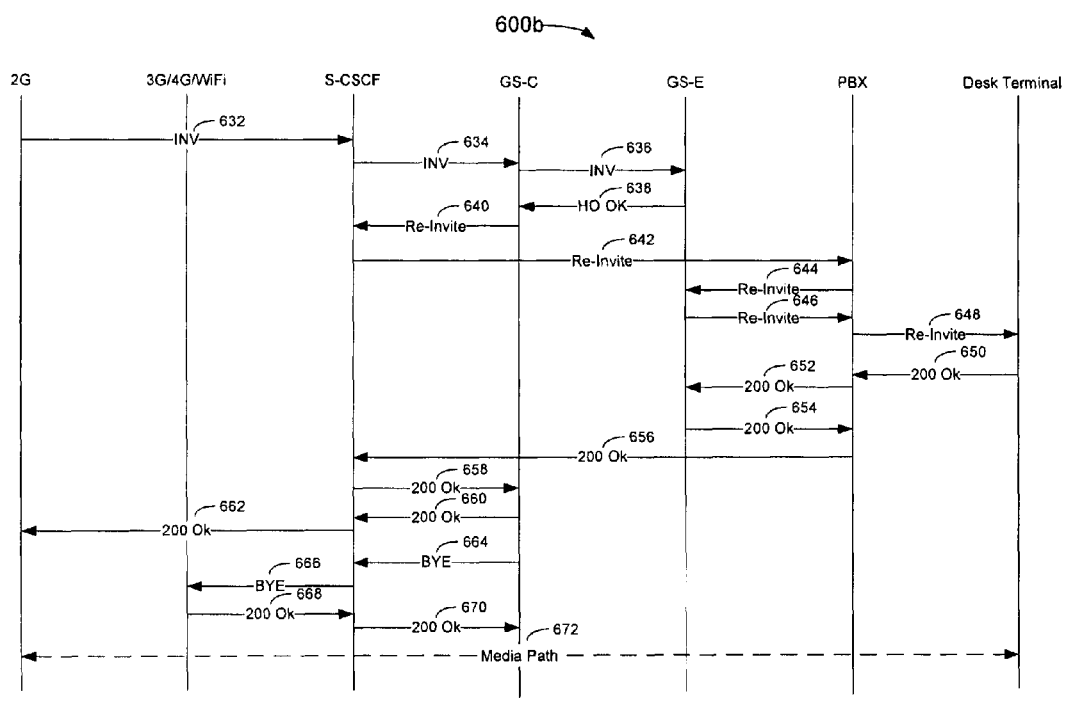

In the signaling flow 600b depicted in FIG. 6B, assume the UE now exits 3G packetized coverage and moves into a coverage area served only by 2G. Accordingly, the UE now attempts to initiate a handover request to the carrier's VCC service by originating a call on the 2G network. After conversion of the call by the 2G MSC into an IMS call via triggering or other method, an invite is sent to the S-CSCF (step 632). The S-CSCF, based on initial filter criteria, sends the invite to the GS-C for handling (step 634). If the GS-C allows the handover to occur based on criteria analyzed in the GS-C (for example, the carrier determines there is sufficient capacity on the 2G network to continue this call and the subscription is active or for other based on other carrier policy criteria), then the GS-C forward the request to the GS-E (step 636) hosting the enterprise VCC function. If the GS-E allows the handover to occur based on criteria analyzed in the GS-E (for example, the enterprise elects to allow the handover to proceed in order to maintain the call and is willing to accept the 2G call tariffs or for other enterprise criteria) then the GS-E informs the GS-C to proceed (step 638). The GS-C then sends a re-invite for the leg of the call to the desk phone to the S-CSCF (step 640). The S-CSCF then forwards the re-invite to the enterprise PBX (step 642), which forwards the re-invite to the GS-E (step 644) which responds to the PBX (step 646). The PBX forwards the re-invite to the desk terminal (step 648), and the desk terminal acknowledges the invite (step 650). The PBX then forwards the acknowledgment to the GS-E (step 652) and the GS-E provides an acknowledgment thereto (step 654). The PBX forwards the acknowledgment to the S-CSCF (step 656) which provides the acknowledgment to the GS-C (step 658) that, in turn, replies with an acknowledgment (step 660). The S-CSCF then provides an acknowledgement to the 2G MSC (step 662) via a WMG connected to the 2G MSC. The GS-C provides a BYE message to the S-CSCF for terminating the circuit switched call leg (step 664). The S-CSCF then forwards the BYE message to the UE (step 666) over the 3G packet network which may provide an acknowledgment thereto (step 668). The S-CSCF then forwards an acknowledgment to the GS-C (step 670) and the media path is set up thereby completing the call handover (step 672). The call then comprises a 2G, or circuit-switched call leg, between the 2G MSC and a carrier WMG interconnected with the 2G MSC, and packet-switched call legs between the WMG and the PBX, the PBX and the enterprise gateway server, and the enterprise gateway server and the desk terminal.

Figure 6C:
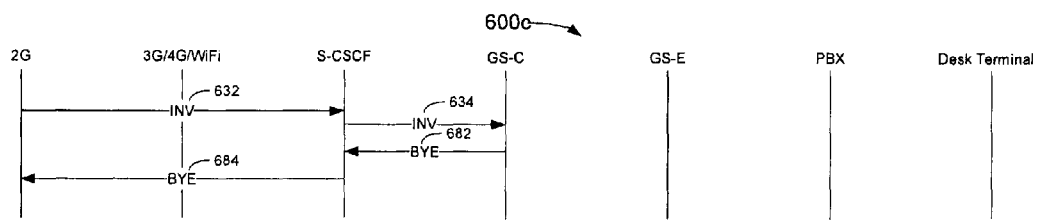

Returning to the case where the UE attempts to initiate a handover request to the carrier's VCC service by sending an invite to the S-CSCF (step 632) and the S-CSCF sends the invite to the GS-C for handling (step 634), if the GS-C instead disallows the handover to occur based on criteria analyzed in the GS-C (for example, the carrier determines there is insufficient capacity on the 2G packetized network to handle this call or the subscription is inactive), then the GS-C responds with a Bye message to the S-CSCF (step 682) indicating the handover request has been denied as depicted by the signaling flow 600c of FIG. 6C. The Bye message is then sent to the 2G MSC (step 684) via the WMG connected to the 2G MSC. The handover request is terminated and the UE remains on the 3G packet network.

Figure 6D:
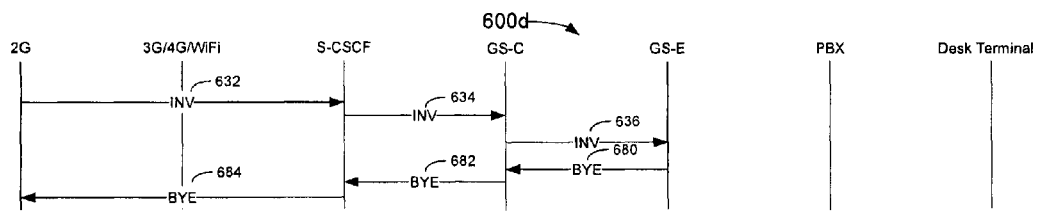

If the GS-C allows the handover to occur, the GS-C then sends the request to the GS-E for handling (step 636) as depicted by the signaling flow 600d of FIG. 6D. If instead the GS-E disallows the handover to occur based on criteria analyzed in the GS-E (for example, the enterprise elects to maintain the call on the 3G network to avoid 2G tariffs or for other policy reasons), then the GS-E responds with a Bye message to the GS-C indicating the handover request has been denied (step 680), which is sent to the S-CSCF (step 682) indicating the handover request has been denied. The Bye message is then sent to the 2G MSC (step 684) via the WMG connected to the 2G MSC. The handover request is terminated and the UE remains on the 3G packet network.

FIGS. 7A-7D depict exemplary signaling flows for a multi-mode mobile handover featuring voice call continuity from a packet network to a circuit network implemented in accordance with another embodiment whereby seamless handover mechanisms are provided for calls established on the enterprise side of the network by enterprise VCC capabilities.

In this implementation, the enterprise GS-E acts as the primary contact point by the multi-mode device when a handover is to occur, and as such the GS-E performs the VCC handover with permission obtained from the GS-C. In the particular example, a call is handed off between an unlicensed WiFi packet voice network and a 2G circuit network while remaining anchored in the enterprise such that enterprise services, e.g., PBX features, call monitoring, and the like, may be provided to the call and maintained over the seamless handover.

Figure 7A:
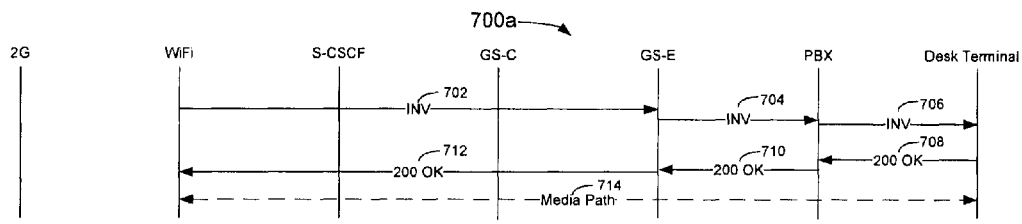
FIGS. 7A-7D depict exemplary signaling flows for a multi-mode mobile handover featuring voice call continuity from a packet network to a circuit network whereby seamless handover mechanisms are provided for calls established on the enterprise side of the network by enterprise VCC capabilities in accordance with another embodiment.

In the signaling flow 700a of FIG. 7A, the user of a multi-mode device originates a packetized voice call over the WiFi network to a desk phone in the enterprise. A call invite is issued by the UE over the WiFi packet network to the GS-E (step 702). The GS-E forwards the invite to the PBX (step 704) which delivers the call to the desk terminal (step 706). The desk terminal then returns an invite acknowledgement (step 708), e.g., a SIP 200 response.

The PBX forwards the acknowledgment to the GS-E (step 710), which replies to the UE with an acknowledgment (step 712) and the media path is set up (step 714). In this instance, the call comprises a packet switched call between the UE and the PBX, the PBX and the enterprise gateway server, and the enterprise gateway server and the desk terminal.

Figure 7B:
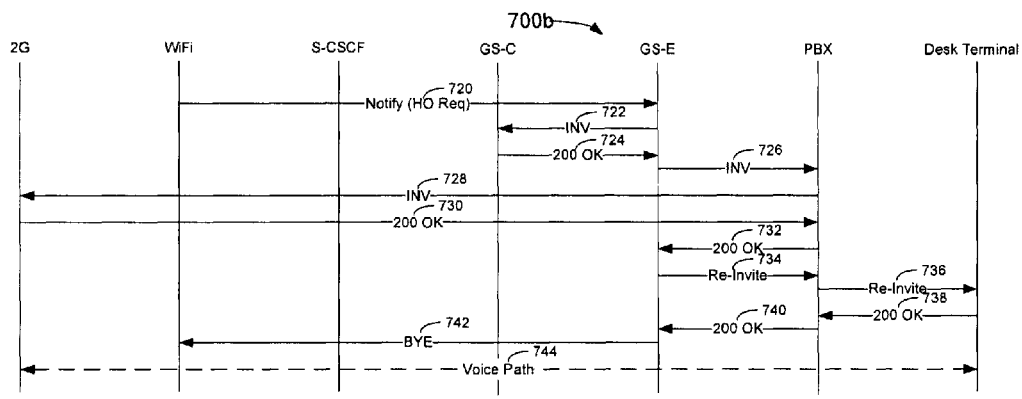

Following therefrom as depicted in the signaling flow 700b of FIG. 7B, assume the UE moves away from WiFi coverage and into a 2G coverage area. Accordingly, the UE now attempts to initiate a handover request to the enterprise's VCC service by sending a notification over the WiFi network to the GS-E hosting the enterprise VCC function (step 720).

The handover request by the UE over the WiFi network may be sent to an IP address or to a domain name that is resolved to the enterprise's VCC service. If the GS-E allows the handover to occur based on criteria analyzed in the GS-E (for example, the enterprise elects to allow the handover in order to maintain the call and accept the 2G tariffs or for other enterprise criteria), then the GS-E forward the request to the GS-C (step 722) hosting the carrier VCC function. If the GS-C allows the handover to occur based on criteria analyzed in the GS-C (for example, the carrier identifies that the enterprise has subscribed to this service, the carrier identifies there is sufficient 2G capacity for the call, or for other carrier policy criteria) then the GS-C informs the GS-E to proceed (step 724).

The GS-E then sends an invite to the PBX to originate a call to the multi-mode mobile on the 2G network (step 728). The outbound PBX call to the 2G MSC may traverse the PSTN via a media gateway in the enterprise connected to the PBX. On a successful connection to the multi-mode device on the 2G network, the 2G MSC responds to the PBX via the PSTN (step 730). The PBX sends an acknowledgement to the GS-E (step 732) which then sends a re-invite for the leg of the call to the desk phone to the PBX (step 734) which in turn sends the re-invite to the desk phone (step 736). The desk phone then provides an acknowledgement to the PBX (step 738) which responds to the GS-E (step 740).

The GS-E informs the UE over the WiFi network to terminate the WiFi leg with a Bye message (step 742) and the media path is set up thereby completing the call handover (step 744). The call then comprises a 2G, or circuit-switched call leg, between the 2G MSC and a carrier WMG interconnected with the 2G MSC, and packet-switched call legs between the WMG and the PBX, the PBX and the enterprise gateway server, and the enterprise gateway server and the desk terminal.

Figure 7C:
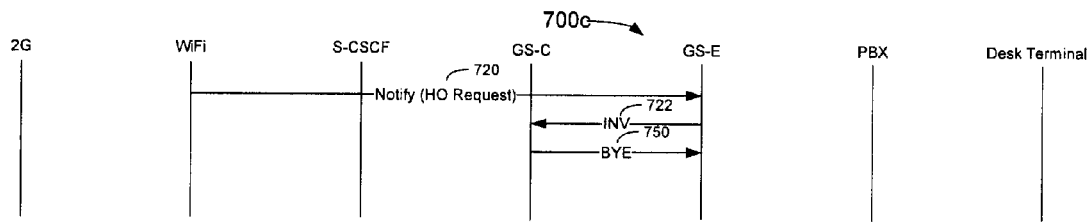

Returning to the case where the UE attempts to initiate a handover request to the enterprise's VCC service by sending an invite to the GS-E (step 720) and the GS-E sends the invite to the GS-C for permission (step 722), if the GS-C instead disallows the handover to occur based on criteria analyzed in the GS-C (for example, the carrier determines there is insufficient capacity on the 2G network, the enterprise has not subscribed to this service or other policy reasons), then the GS-C responds with a Bye message to the GS-E (step 750) as depicted in the signaling flow 700c of FIG. 7C. The Bye message indicates the handover request has been denied, and the handover request does not proceed. The UE remains on the WiFi packet network.

Figure 7D:
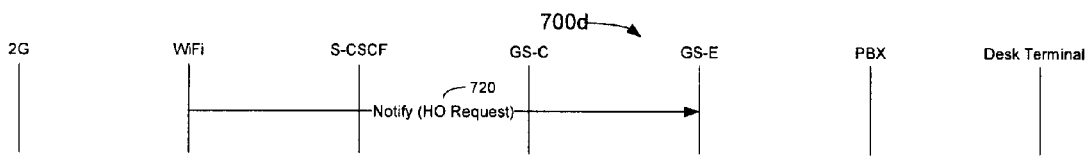

If instead the GS-E disallows the handover to occur based on criteria analyzed in the GS-E (for example, the enterprise elects to maintain the call on the WiFi network to avoid 2G tariffs or for other enterprise policy criteria), then the GS-E ignores the notification as depicted by the signaling flow 700d in FIG. 7D. The handover request does not proceed and the UE remains on the WiFi packet network.

Figure 8:
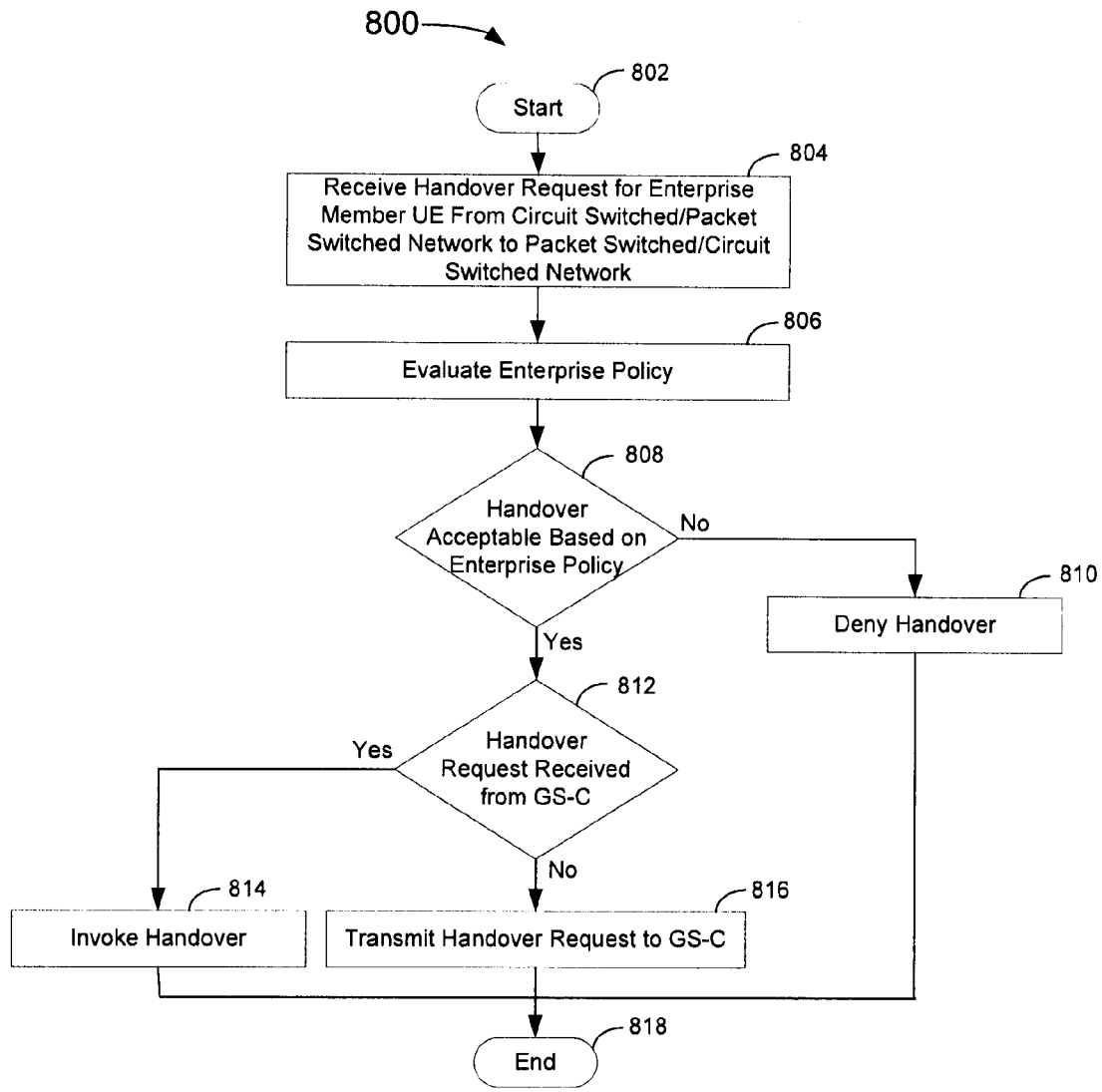
FIG. 8 is a flowchart that depicts processing of an enterprise voice call continuity routine that facilitates handover collaboration between a carrier network and an enterprise network in accordance with an embodiment.

FIG. 8 is a flowchart 800 that depicts processing of an enterprise voice call continuity routine that facilitates handover collaboration between a carrier network and an enterprise network in accordance with an embodiment. The processing steps of FIG. 8 may be implemented as computer-executable instructions tangibly embodied on a computer-readable medium executable by a processing system, such as the GS-E 176 depicted in the network system 100 of FIG. 1.

The enterprise VCC routine is invoked (step 802), and a request for handover of an enterprise member UE from a circuit switched network to a packet switched network (or, alternatively, from a packet switched network to a circuit switched network) is received by the GS-E (step 804). The GS-E may then evaluate enterprise policies (step 806), e.g., specified in enterprise policy database 178, to determine whether to allow or disallow the handover request (step 808). If the evaluation of the enterprise policies indicates that the handover request is not acceptable, the GS-E may then deny the handover (step 810), and the UE remains on the network with which the UE is currently registered. The GS-E VCC routine cycle may then end (step 818).

Returning to step 808, in the event that the GS-E determines the handover request is acceptable based on the evaluated enterprise policies, the GS-E may then evaluate if the handover request was received from the GS-C (step 812). If the handover request was received from the GS-C thereby indicating the GS-C has approved the handover request, the GS-E may then invoke the handover (step 814). For example, the GS-C will receive and allow or disallow the handover request when the UE is currently registered in the carrier network. In the event the GS-C allows the handover request, the GS-C will forward the handover request to the GS-E for evaluation of the handover request according to the enterprise policies. Upon invocation of the handover, the GS-E VCC routine cycle may then end according to step 818.

Returning again to step 812, in the event that the handover request was not received by the GS-E from the GS-C, the GS-E then forwards the handover request to the GS-C (step 816). For example, if the UE is currently registered in the enterprise network when the handover request is issued by the UE, the handover request will be transmitted to the GS-E for evaluation thereby. If the GS-E approves the handover request, the GS-E then forwards the request to the GS-C for evaluation of the request according to the carrier policies. After forwarding the handover request to the GS-C, the GS-C VCC routine cycle then ends according to step 818.

Figure 9:
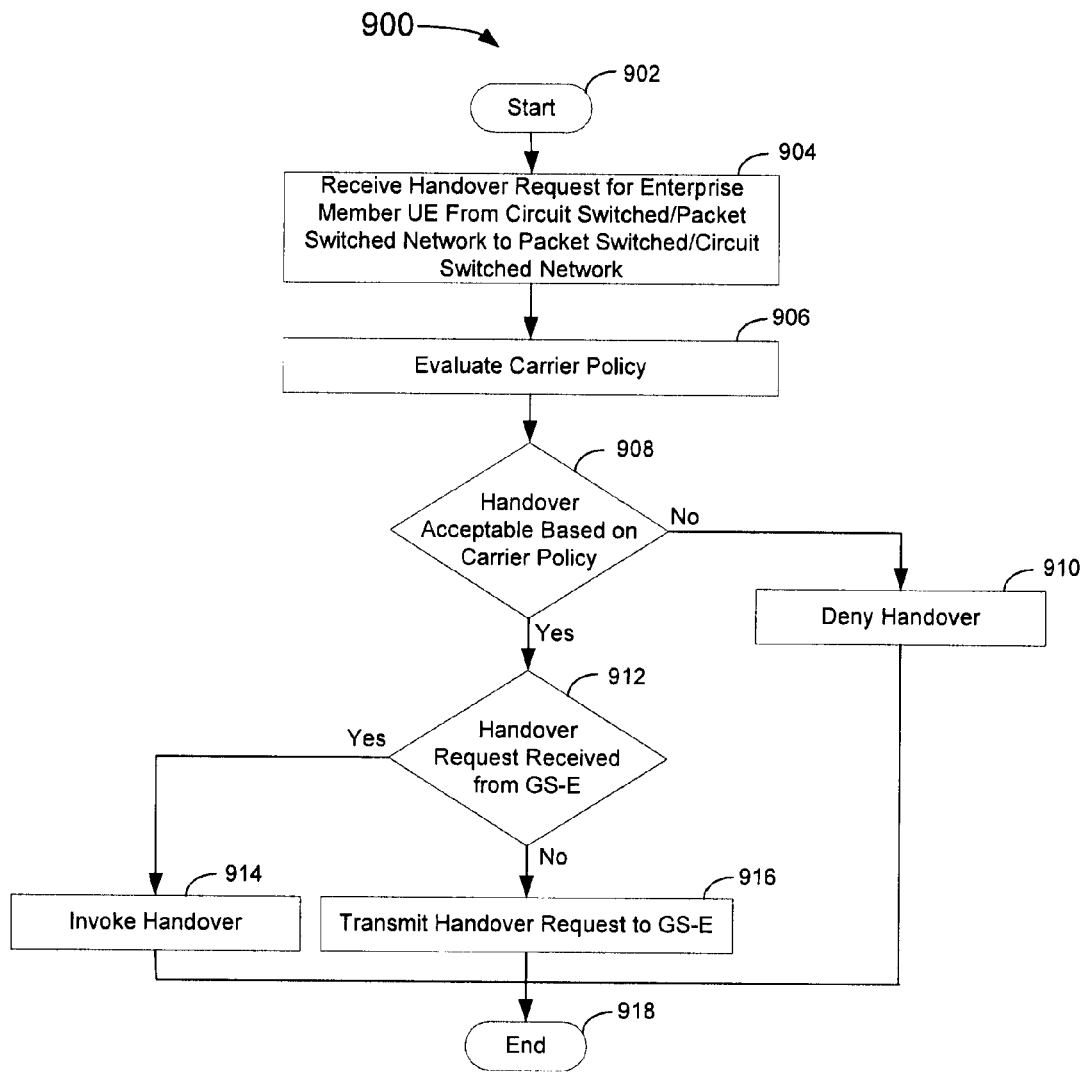
FIG. 9 is a flowchart that depicts processing of a carrier voice call continuity routine that facilitates handover collaboration between a carrier network and an enterprise network in accordance with an embodiment.

FIG. 9 is a flowchart 900 that depicts processing of a carrier voice call continuity routine that facilitates handover collaboration between a carrier network and an enterprise network in accordance with an embodiment. The processing steps of FIG. 9 may be implemented as computer-executable instructions tangibly embodied on a computer-readable medium executable by a processing system, such as the GS-C 192 depicted in the network system 100 of FIG. 1.

The carrier VCC routine is invoked (step 902), and a request for handover of an enterprise member UE from a circuit switched network to a packet switched network (or, alternatively, from a packet switched network to a circuit switched network) is received by the GS-C (step 904). The GS-C may then evaluate carrier policies (step 906), e.g., specified in carrier policy database 194, to determine whether to allow or disallow the handover request (step 908). If the evaluation of the carrier policies indicates that the handover request is not acceptable, the GS-C may then deny the handover (step 910), and the UE remains on the network with which the UE is currently registered. The GS-C VCC routine cycle may then end (step 918).

Returning to step 908, in the event that the GS-C determines the handover request is acceptable based on the evaluated carrier policies, the GS-C may then evaluate if the handover request was received from the GS-E (step 912). If the handover request was received from the GS-E thereby indicating the GS-E has approved the handover request, the GS-C may then invoke the handover (step 914). For example, the GS-E will receive and allow or disallow the handover request prior to receipt of the handover request by the GS-C when the UE is currently registered in the enterprise network. In the event the GS-E allows the handover request, the GS-E will forward the handover request to the GS-C for evaluation of the handover request according to the carrier policies. Upon invocation of the handover, the GS-C VCC routine cycle may then end according to step 918.

Returning again to step 912, in the event that the handover request was not received by the GS-C from the GS-E, the GS-C then forwards the handover request to the GS-E (step 916). For example, if the UE is currently registered in the carrier network when the handover request is issued by the UE, the handover request will be transmitted to the GS-C for evaluation thereby. If the GS-C approves the handover request, the GS-C then forwards the request to the GS-E for evaluation of the request according to the enterprise policies. After forwarding the handover request to the GS-E, the GS-E VCC routine cycle then ends according to step 918.

The flowcharts of FIGS. 8-9 depict process serialization to facilitate an understanding of disclosed embodiments and are not necessarily indicative of the serialization of the operations being performed. In various embodiments, the processing steps described in FIGS. 8-9 may be performed in varying order, and one or more depicted steps may be performed in parallel with other steps. Additionally, execution of some processing steps of FIGS. 8-9 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method, comprising:
   locating, by a user equipment registered in a first network, a second network, wherein one of the first network and the second network comprises a circuit switched network and another of the first network and the second network comprises a packet switched network;
   transmitting, by the user equipment, a request for a handover to the second network, the request being received by at least one of an enterprise gateway server of the packet switched network and a carrier gateway server of the circuit switched network; and
   determining, by a voice call continuity service, whether to allow the handover by an enterprise network node and a carrier network node, wherein whether to allow the handover comprises at least one of dual approval by both the enterprise network node and the carrier network node and single approval by one of the enterprise network node and the carrier network node which is designated as an override authority, wherein the enterprise network node is controlled by an enterprise network and the carrier network node is controlled by a carrier network.

2. The method of claim 1, wherein the enterprise network node comprises an enterprise gateway server and the carrier network node comprises a carrier gateway server, and wherein determining whether to allow the handover comprises:
receiving, by the enterprise gateway server, the handover request; and
evaluating, by the enterprise gateway server, an enterprise policy.

3. The method of claim 2, further comprising determining, by the enterprise gateway server, to disallow the handover based on the enterprise policy.

4. The method of claim 2, further comprising:
determining, by the enterprise gateway server, to allow the handover based on the enterprise policy;
notifying, by the enterprise gateway server, the carrier gateway server of the handover request; and
evaluating, by the carrier gateway server, a carrier policy.

5. The method of claim 4, further comprising:
disallowing, by the carrier gateway server, the handover based on the carrier policy; and
notifying, by the carrier gateway server, the enterprise gateway server that the handover request is denied.

6. The method of claim 4, further comprising:
allowing, by the carrier gateway server, the handover based on the carrier policy; and
completing handover of the user equipment from the first network to the second network.

7. The method of claim 1, wherein the enterprise network node comprises an enterprise gateway server and the carrier network node comprises a carrier gateway server, and wherein determining whether to allow the handover comprises:
receiving, by the carrier gateway server, the handover request;
evaluating, by the carrier gateway server, a carrier policy; and
determining, by the carrier gateway server, to disallow the handover based on the carrier policy.

8. The method of claim 1, wherein the enterprise network node comprises an enterprise gateway server and the carrier network node comprises a carrier gateway server, and wherein determining whether to allow the handover comprises:
receiving, by the carrier gateway server, the handover request;
evaluating, by the carrier gateway server, a carrier policy;
determining, by the carrier gateway server, to allow the handover based on the carrier policy;
notifying, by the carrier gateway server, the enterprise gateway server of the handover request; and
evaluating, by the enterprise gateway server, an enterprise policy to determine whether to allow the handover.

9. The method of claim 8, further comprising:
allowing, by the enterprise gateway server, the handover; and
completing handover of the user equipment from the first network to the second network.

10. A non-transitory computer-readable medium having computer-executable instructions for execution by a processing system, the computer-executable instructions, when executed, cause the processing system to:
receive a request for a handover of a user equipment from a first network in which the user equipment is registered to a second network, wherein one of the first network and the second network comprises a circuit switched network and another of the first network and the second network comprises a packet switched network, the request being received by at least one of an enterprise gateway server of the packet switched network and a carrier gateway server of the circuit switched network; and
determine, by a voice call continuity service, whether to allow the handover by an enterprise network node and a carrier network node, wherein whether to allow the handover comprises at least one of dual approval by both the enterprise network node and the carrier network node and single approval by one of the enterprise network node and the carrier network node which is designated as an override authority, wherein the enterprise network node is controlled by an enterprise network and the carrier network node is controlled by a carrier network.

11. The non-transitory computer-readable medium of claim 10, wherein the enterprise network node comprises an enterprise gateway server and the carrier network node comprises a carrier gateway server, and wherein the instructions that determine whether to allow the handover comprise instructions that, when executed, cause the processing system to:
evaluate, by the enterprise gateway server, an enterprise policy; and
determine, by the enterprise gateway server, to disallow the handover based on the enterprise policy.

12. The non-transitory computer-readable storage medium of claim 10, wherein the enterprise network node comprises an enterprise gateway server and the carrier network node comprises a carrier gateway server, and wherein the instructions that determine whether to allow the handover comprise instructions that, when executed, cause the processing system to:
evaluate, by the enterprise gateway server, an enterprise policy;
determine, by the enterprise gateway server, to allow the handover based on the enterprise policy;
notify, by the enterprise gateway server, the carrier gateway server of the handover request; and
evaluate, by the carrier gateway server, a carrier policy.

13. The non-transitory computer-readable storage medium of claim 12, further comprising instructions that, when executed, cause the processing system to:
disallow, by the carrier gateway server, the handover based on the carrier policy; and
notify, by the carrier gateway server, the enterprise gateway server that the handover request is denied.

14. The non-transitory computer-readable storage medium of claim 12, further comprising instructions that, when executed, cause the processing system to:
allow, by the carrier gateway server, the handover based on the carrier policy; and
complete handover of the user equipment from the first network to the second network.

15. The non-transitory computer-readable storage medium of claim 10, wherein the enterprise network node comprises an enterprise gateway server and the carrier network node comprises a carrier gateway server, and wherein the instructions that determine whether to allow the handover comprise instructions that, when executed, cause the processing system to:
- receive, by the carrier gateway server, the handover request;
- evaluate, by the carrier gateway server, a carrier policy; and
- determine, by the carrier gateway server, to disallow the handover based on the carrier policy.

16. The non-transitory computer-readable storage medium of claim 10, wherein the enterprise network node comprises an enterprise gateway server and the carrier network node comprises a carrier gateway server, and wherein the instructions that determine whether to allow the handover comprise instructions that, when executed, cause the processing system to:
- receive, by the carrier gateway server, the handover request;
- evaluate, by the carrier gateway server, a carrier policy;
- determine, by the carrier gateway server, to allow the handover based on the carrier policy;
- notify, by the carrier gateway server, the enterprise gateway server of the handover request; and
- evaluate, by the enterprise gateway server, an enterprise policy to determine whether to allow the handover.

17. A communication network system, comprising:
- a carrier network that includes a carrier gateway server and a carrier policy database;
- an enterprise network that includes an enterprise gateway server communicatively coupled with the carrier gateway server and an enterprise policy database; and
- a user equipment associated with the enterprise network, wherein the user equipment is registered in a first network and transmits a request for handover to a second network, wherein one of the first network and the second network comprises a circuit switched network and another of the first network and the second network comprises a packet switched network, and wherein the request is received by at least one of the enterprise gateway server of the packet switched network and the carrier gateway server of the circuit switched network wherein the carrier network and the enterprise network collaboratively provide a voice call continuity service, wherein whether to allow the handover comprises at least one of dual approval by both the enterprise gateway server and the carrier gateway server and single approval by one of the enterprise gateway server and the carrier gateway server which is designated as an override authority.

18. The network system of claim 17, wherein the first network is controlled by the enterprise network, wherein the enterprise gateway server receives the handover request and, upon approval of the handover request based on an evaluation of the enterprise policy database by the enterprise gateway server, forwards the handover request to the carrier gateway server for evaluation of the handover request.

19. The network system of claim 17, wherein the first network is controlled by the carrier network, wherein the carrier gateway server receives the handover request and, upon approval of the handover request based on an evaluation of the carrier policy database by the carrier gateway server, forwards the handover request to the enterprise gateway server for evaluation of the handover request.

20. A method for providing handover services in disparate packet switched networks, comprising:
- receiving a request for a handover from a user equipment from a first packet switched network in which the user equipment is registered to a second packet switched network, the request being received by an enterprise gateway server of the second packet switched network, wherein the first packet switched network and the second packet switched network operate in different packet switched modes; and
- determining whether to allow the handover by an enterprise network node and a carrier network node, wherein a requirement to allow the handover comprises at least one of dual approval by both the enterprise network node and the carrier network node and single approval by one of the enterprise network node and the carrier network node which is designated as an override authority, wherein the enterprise network node is controlled by an enterprise network and the carrier network node is controlled by a carrier network.

21. The method of claim 20, wherein evaluating the request comprises:
- receiving, by the enterprise network node, the request;
- determining, by the enterprise network node, to allow the handover; and
- forwarding, by the enterprise network node, the request to the carrier network node for evaluation of the request.

22. The method of claim 20, wherein evaluating the request comprises:
- receiving, by the carrier network node, the request;
- determining, by the carrier network node, to allow the handover; and
- forwarding, by the carrier network node, the request to the enterprise network node for evaluation of the request.

* * * * *